United States Patent
Seibel et al.

[11] 3,887,788
[45] June 3, 1975

[54] CONDENSATION FREE MIRROR

[75] Inventors: Richard Roy Seibel, Morganville; Robert Rhea, Matawan, both of N.J.

[73] Assignee: Seibel & Seibel Enterprises, Wickatunk, N.J.

[22] Filed: June 26, 1973

[21] Appl. No.: 373,770

Related U.S. Application Data

[63] Continuation-in-part of Ser. No. 297,286, Oct. 13, 1972.

[52] U.S. Cl. .............................. 219/219; 219/543
[51] Int. Cl. ............................................. H05b 1/00
[58] Field of Search .......... 219/219, 202, 203, 543, 219/345, 522

[56] References Cited
UNITED STATES PATENTS

| | | | |
|---|---|---|---|
| 2,939,807 | 6/1960 | Needham | 219/345 X |
| 2,971,073 | 2/1961 | Eisler | 219/345 X |
| 3,288,983 | 11/1966 | Lear, Jr. | 219/203 X |
| 3,313,920 | 4/1967 | Gallez | 209/203 X |
| 3,597,586 | 8/1971 | Rebovich | 219/219 |
| 3,686,473 | 8/1972 | Shirn | 219/219 |
| 3,757,087 | 9/1973 | Berwood | 219/203 X |

*Primary Examiner*—C. L. Albritton

[57] ABSTRACT

An anti-condensation device for mirrors comprising a printed circuit board heating element and a means for mounting said printed circuit board heating element on the rear surface of the mirror is described. The mirror assembly herein provided with said heating element maintains the mirror viewing surface free from moisture condensation. In one embodiment of the invention the temperature of the mirror is allowed to increase at the same rate as the ambient temperature and does not require a temperature controller. In another embodiment two heat generating paths are employed to provide for faster warmup and extended life for the temperature controller. The printed circuit heating element may be of rigid composition board or flexible mylar construction.

5 Claims, 10 Drawing Figures

3,887,788

DC/AC POWER SOURCE

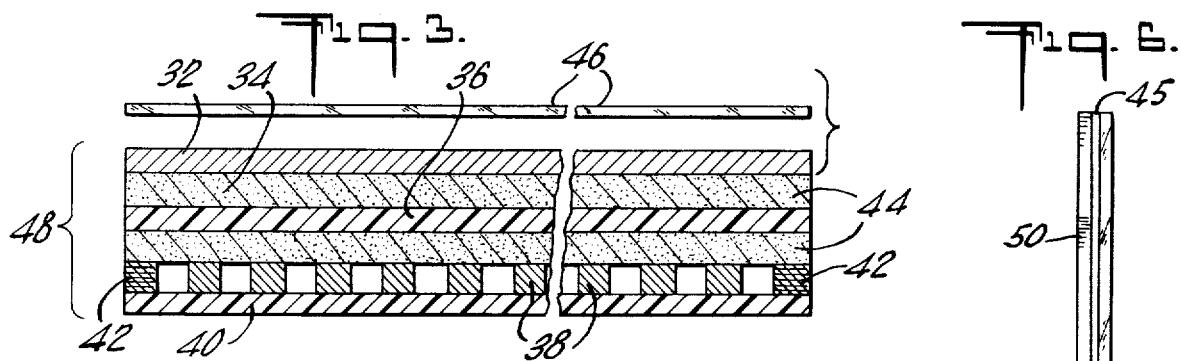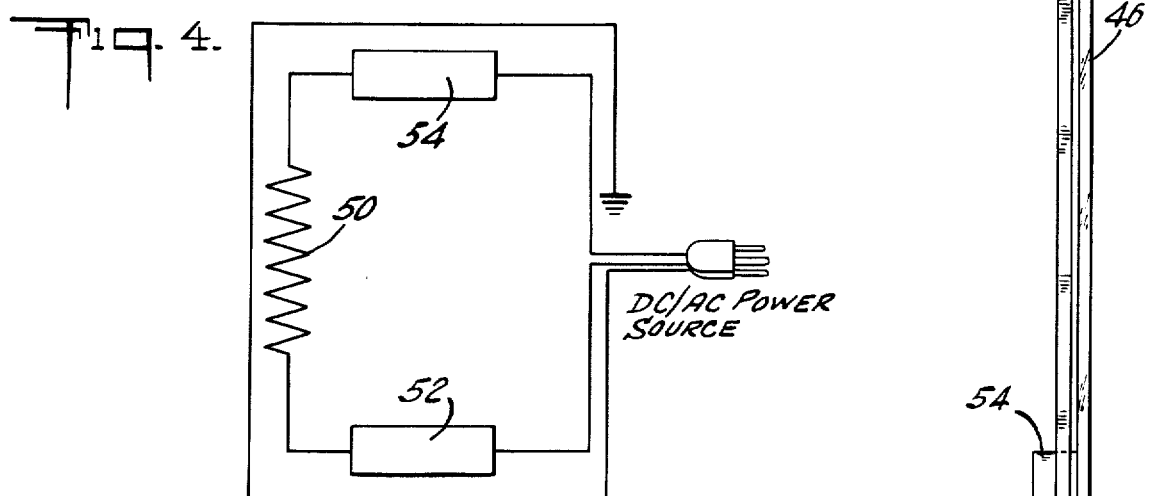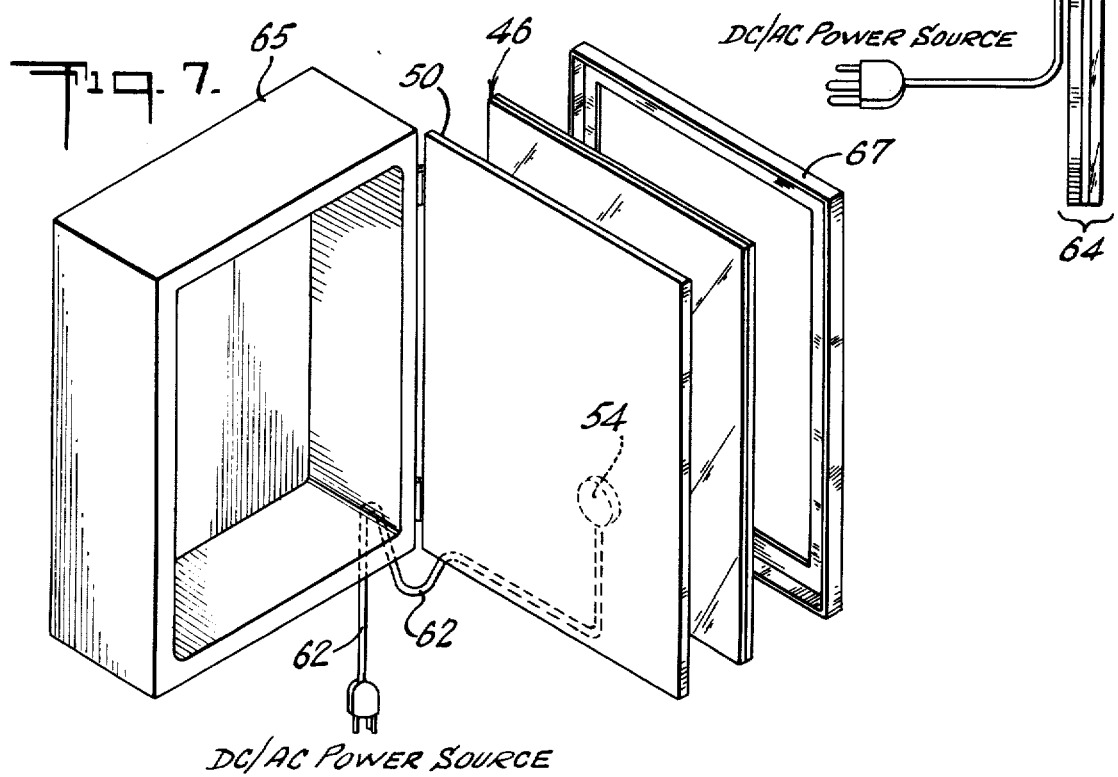

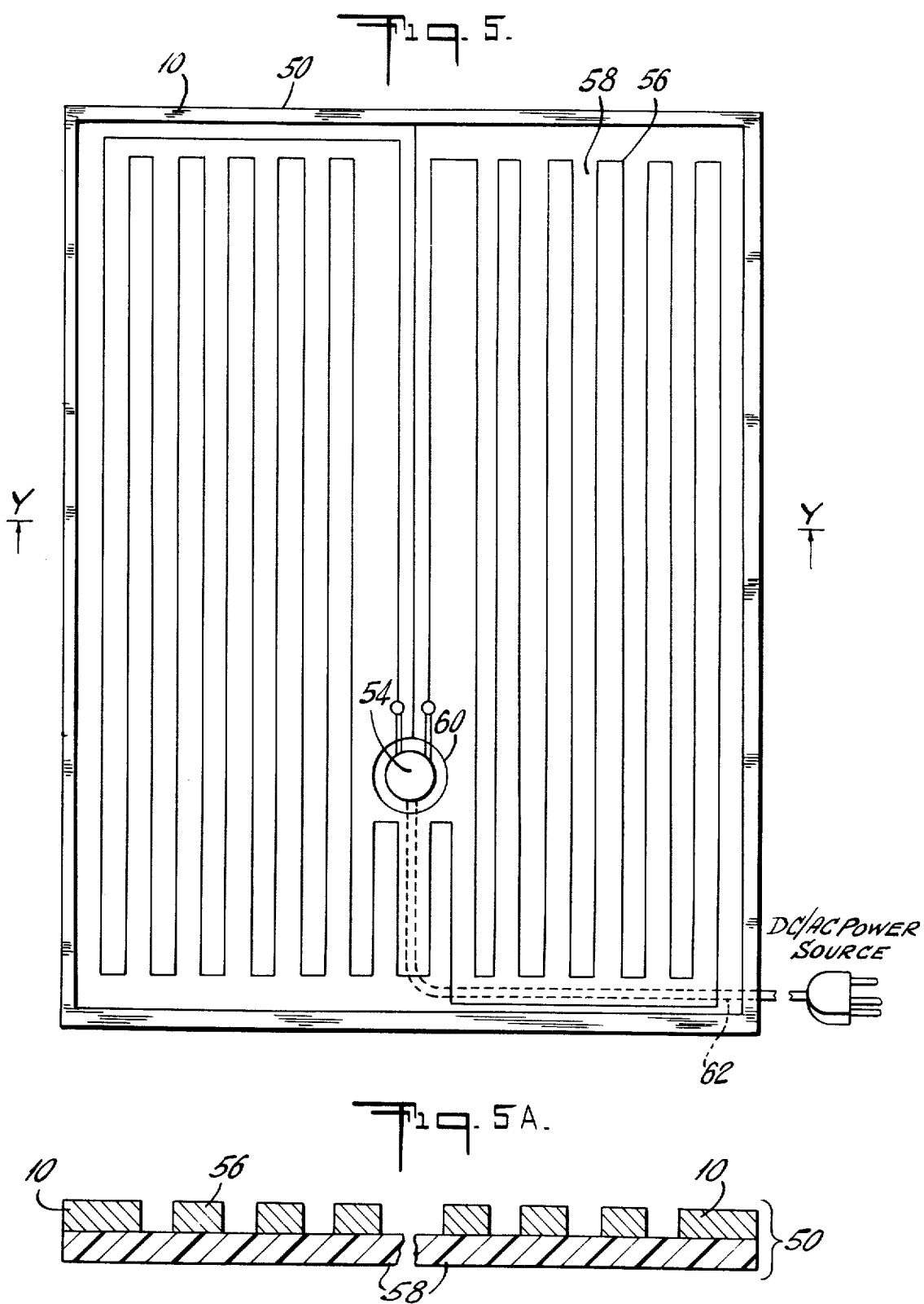

CONDENSATION FREE MIRROR

CROSS-REFERENCE TO RELATED APPLICATION

This application is a continuation-in-part application of application Ser. No. 297,286, filed Oct. 13, 1972.

BACKGROUND OF THE INVENTION

The present invention relates to a condensation free mirror assembly containing a printed circuit board heating element and a means for mounting said heating element onto the rear of the mirror surface to provide heat to the front surface of the mirror and thereby prevent the formation of moisture condensation on said mirror surface. The invention is particularly adapted to mirrors located in a bathroom, steam room or the like in close proximity to a shower, or any other moisture generator, since it is common for the mirror to fog when heated water is caused to flow from the shower. This fogging of the mirror is due to condensation of warm water vapor upon the cold front surface of the mirror. Several prior art attempts have been proposed for preventing condensation on bathroom mirrors and the like.

PRIOR ART

The prior art devices for preventing condensation formation on bathroom mirrors and the like, in general, require manual energization of an electrical switch in order to permit electric current to flow through the heating element. One of such devices is adequately described in U.S. Pat. No. 3,160,736 wherein the heating element is depicted as a fibrous board formed with a continuous winding or sinuous groove containing an electrical resistance heating wire. Mass manufacturing of this winding groove and the placement of the resistance wire into this groove is not practical and is too costly. The mirror assembly described in said patent has switching apparatus, which requires the cabinet door to be closed in order to energize the heating element; hence when the cabinet door is open, the circuit through the heating element is broken and the mirror does not heat up. Fast warm-up time is a manual operation and if unattended, may exceed safe temperatures. No thermal safety devices are incorporated into the heating design. The heating system is probably inefficient because a good heat conducting bond between the heat source (wire) and mirror is not present.

In another prior art device described in U.S. Pat. No. 3,530,275 a thermal sensitive switch is mounted onto the hot water supply pipe of the shower. When heated water of a predetermined temperature flows through the pipe, the switch is closed which causes energization of the heating element mounted behind a nearby mirror. However, intricate wiring of the bathroom may be required since the method necessarily includes a connection between the thermal sensitive switch and the heating element of the mirror; in some applications this may be impracticable and costly. Hence the art is in need of a simplified, safe, easily manufactured, efficient and effortless means for preventing the condensation from forming on mirrors when said mirrors are in close proximity to showers and the like.

SUMMARY OF THE INVENTION

In accordance with the present invention, a condensation free mirror assembly is described herein. Said mirror assembly comprises a transparent mirror plate, a light reflective coating on one side of said mirror plate, an electrically energizeable heating element consisting of a printed circuit board, containing a continuous etched conducting path of suitable material such as copper, aluminum, Nichrome and the like, a means for mounting said heating element to said transparent mirror plate, a means of electrical power supply whereby electrical power can be transmitted from an electrical power source to said heating element thereby energizing said heating element to effect the heating of said plate glass. The board composition acts as a heat barrier and protects the etched copper or aluminum paths from damage and the possibility of electrical shock. Printed circuit boards may be mass produced easily and economically. In a broader embodiment, the printed circuit board heating element of the present invention is useful for warming any surface solid, liquid or gas.

In one embodiment of the present invention, the heating element additionally contains an aperture through which a thermal fuse opens the heating circuit with excessive temperature. It is suitably connected to the heating element and is contacted with the transparent plate glass thereby providing a means for preventing the temperature of the plate glass from exceeding a safe level.

In another embodiment of this invention, an anticondensation device is described comprising an electrically energizeable printed circuit board heating element; the board having an off centered aperture and an electronic control circuit. This electronic control circuit is used to regulate the current of said heating element. The thermal overload protector, i.e., thermal fuse is also suitably located within said aperture to sense the mirror plate temperature and is electrically connected to said heating element; said mirror plate to be heated by said electrically energizeable printed circuit board heating element.

There are two basic schemes for heating a mirror with the printed circuit board heating element. The first scheme (Scheme No. 1) permits the temperature of the mirror to increase at the same rate as the ambient temperature. This technique does not require a temperature controller. The other scheme (Scheme No. 2) permits a faster warm-up time with an extended life feature for the temperature controller (thermostat). Both schemes employ a grounded path on the perimeter of the printed circuit heating element as a safety feature.

The first warm-up scheme contains one heat generating path shown as (12) in FIG. 1. The second warm-up scheme uses two heating generating paths as shown in FIG. 2; one path 22 supplies sufficient heat to maintain the mirror at a predetermined temperature 60°F. to 160°F. This path is always connected directly across the power source and generally has a high resistance to prevent overheating. The other path has a lower resistance 24. When connected to the power source via the temperature controller 28, the path will add additional heat to the mirror which decreases the warm-up time. The low resistance path is only used for fast warm-up and is not needed for continuous operation. This principle of operation greatly extends the life of a mechanical temperature controller (thermostat) which would be placed between 16 and 20 on FIG. 2.

Two types of printed circuit boards may be used. The rigid composition board could be used on flat mirrors and the flexible printed circuit may be used on curved mirrors as well as flat mirrors.

Either copper or aluminum conductors may be used for the paths. However, aluminum is preferred for cost advantages. Other conducting materials may be used, i.e., Nichrome, steel or nickel or the like.

The printed circuit board heating element may be attached to the back of a mirror by a pressure sensitive adhesive. Such a method does not require any drying time. The release liner of said pressure sensitive adhesive is simply peeled off and the printed circuit heating element (module) is pressed against the back of the mirror. It is desirable to use a pressure sensitive adhesive that sandwiches an electrical insulation layer between the back of the mirror and the printed paths of the heating element. The pressure sensitive adhesive additionally maintains a good heat conducting medium.

The peripheral ground path prevents various conducting mediums (i.e., metal or water) from conducting electrical current from the paths to the outside of the printed circuit heating element. The ground path prevents current leakage to any metal frame that may be attached to the mirror assembly or the surrounding area. The ground path is connected to the ground wire of a power source, see FIGS. 1 and 2.

For further understanding of the invention and its embodiments, reference will be made to the following description and accompanying drawings wherein like numerals refer to like parts throughout and which:

FIG. 3 is a schematic cross-sectional view of the flexible printed circuit board in combination with the pressure sensitive adhesive described above;

FIG. 4 is a schematic of the electrical circuit of the printed circuit board heating element showing its control circuit and thermal fuse;

FIG. 5 is a front view of the printed circuit board heating element illustrating how the conductor paths are etched onto the printed circuit board; the temperature controller and power cord are also shown FIG. 5A is a cross-sectional view across y—y; shown;

FIG. 6 is a side view of a condensation free mirror showing the locations of the printed circuit board heating element of FIG. 2 as mounted on the rear mirror surface;

FIG. 7 is a side-to-front view of a cabinet containing a condensation free mirror assembly employing heating scheme shown in FIG. 4. The cabinet door is shown in the open position; said mirror assembly shown in a disassembled form for illustration purposes.

Figure 1:
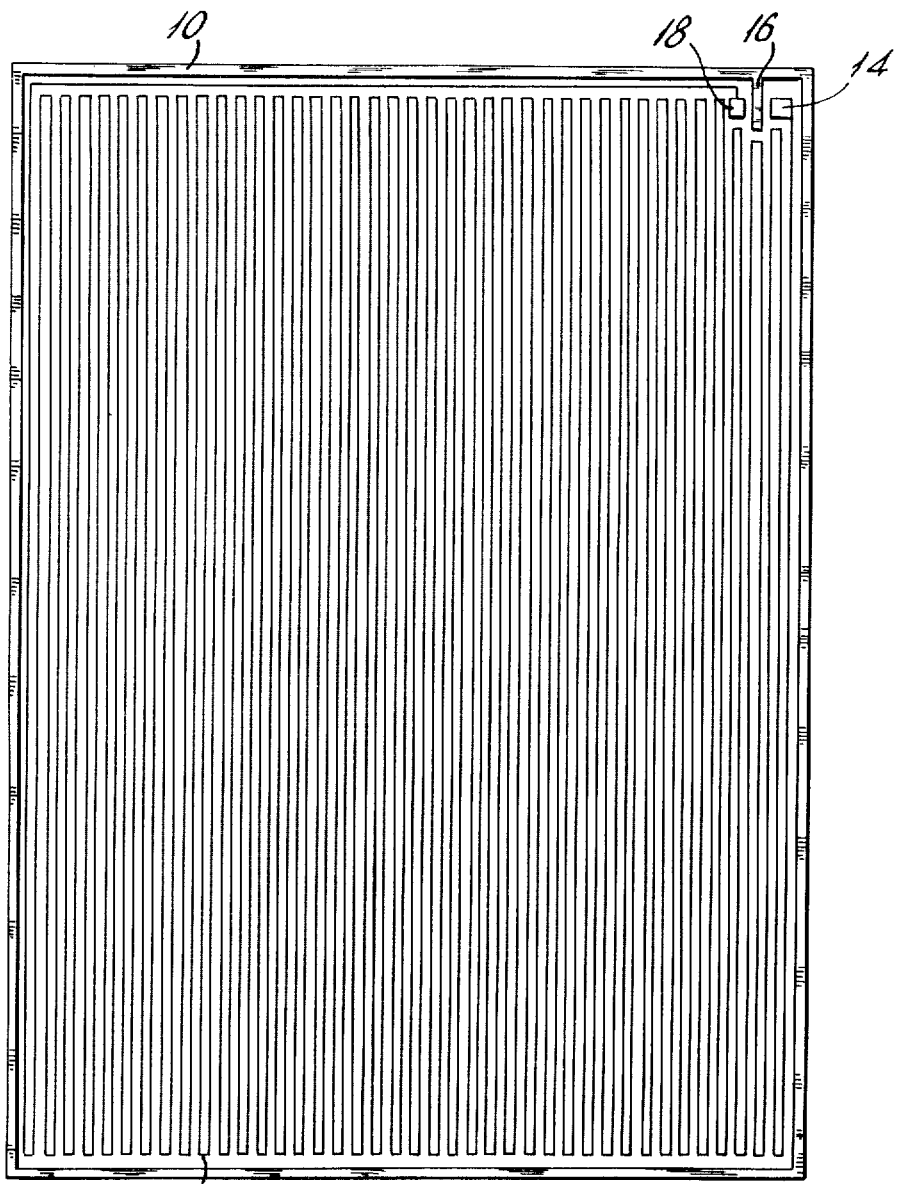
FIG. 1 is a front view of the printed circuit board heating element of Scheme No. 1 described above, also shown as FIG. 1A is said printed circuit board's electrical equivalent shown as a schematic.
Figure 1A:
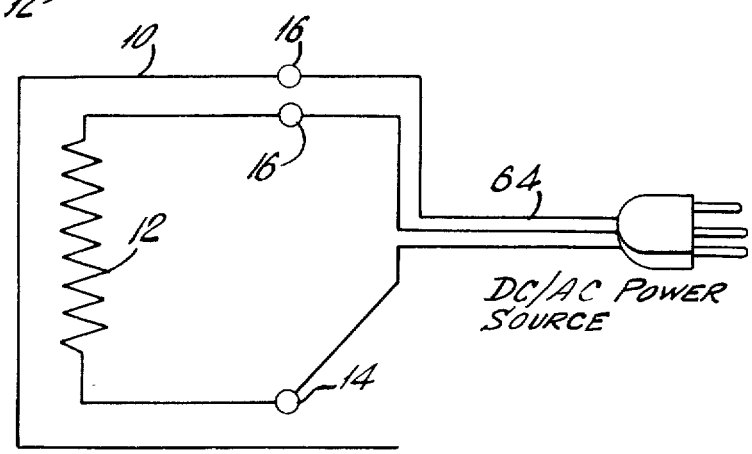

Referring first to FIG. 1, there is shown a front view of the printed circuit board heating element of Scheme No. 1 described above. Also shown as FIG. 1A is the electrical equivalent of said printed circuit board heating element. Surrounding the perimeter of the board is a separate ground path (10); within the perimeter of the board is a continuous etched path of either copper, aluminum or Nichrome as the conductor path (12). Also shown are power terminals 14, 18 and ground terminal 16. Power terminals 14, 18 and ground terminal 16 are connected to the power source via power cord 64. This printed circuit board heating element is suitably connected adjacent to the mirror and serves to heat the mirror plate and maintain it free of condensation. The circuit board may be mounted by either epoxy or by using a pressure sensitive adhesive as more clearly described in the description of FIG. 3.

Figure 2:
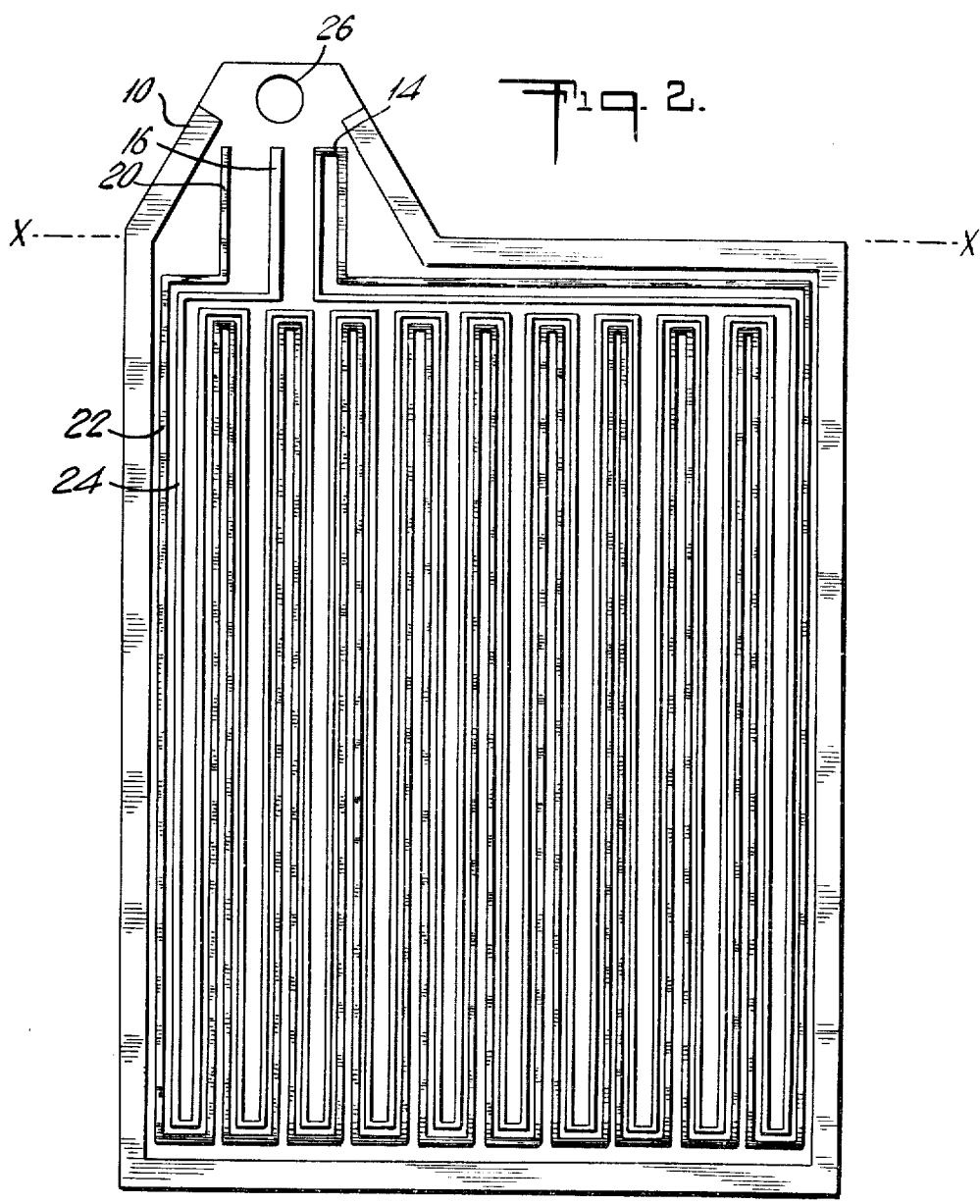
FIG. 2 is a front view of the printed circuit board heating element of Scheme No. 2 described above, also shown as FIG. 2A is said printed circuit board's electrical equivalent shown as a schematic.
Figure 2A:
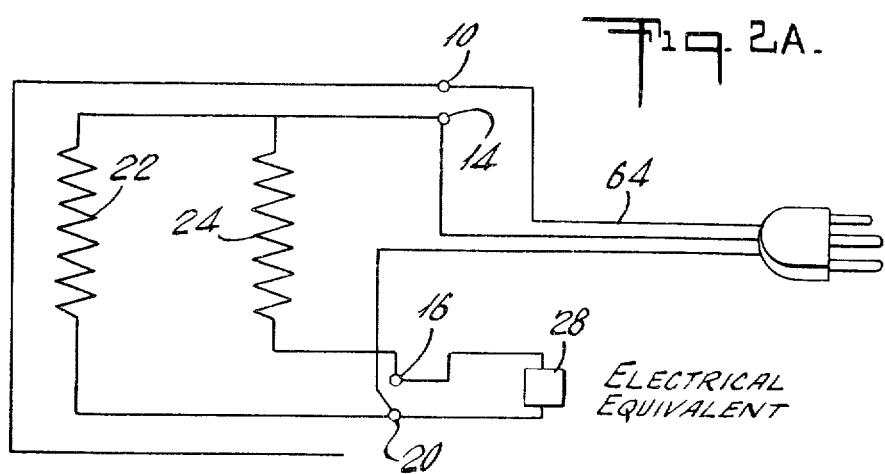

FIG. 2 is a front view of a flexible printed circuit board heating element of Scheme No. 2. Also shown as FIG. 2A is the electrical equivalent of said printed circuit board heating element. Surrounding the perimeter of the circuit board is ground path 10 and two conductor paths a conductor path of high resistance 22 and a conductor path of low resistance 24. A temperature controller 28 is connected to points 16 and 20 and is inserted through aperture 26. The tab is folded along the x—x axis to enable the temperature controller to contact the side opposite the etched conducting paths. Such an electrical hook up greatly extends the life of the temperature controller. The operation of this scheme is described above.

FIG. No. 3 is a cross-sectional view of the flexible printed circuit board in combination with a pressure sensitive adhesive which is used to attach the printed circuit board to the rear surface of a mirror. Illustrated in this FIG. is the mirror 46. The release liner 32 is attached to the outer layer of the pressure sensitive adhesive 34. The adhesive 44 sandwiches an electrical insulating layer, such as mylar 36. Also shown is the ground path 42, the etched conductor heating paths 38, a flexible board or carrier such as mylar 40, the combination of components 32, 34, 36, 38, 40 and 42 comprise the heating module 48. The release liner is removed and the heating module is attached by means of the pressure sensitive adhesive to the back side of the mirror 46. The method of attaching the printed circuit heating element to the back of a mirror by the pressure sensitive adhesive has been described above.

FIG. 4 is a schematic of the printed circuit board heating element 50 connected to an electronic control circuit 52 and a thermal fuse 54. The operation of a printed circuit board heating element hooked up in this manner is as follows. The electronic control circuit 52 is wired in series with the printed circuit heating element 50. The thermal fuse 54 is connected in series with heating element 50 and control circuit 52. The temperature sensitive control circuit 52 regulates the temperature of heating element to a preset temperature (60°F. to 160°F.)

FIG. 5 shows a printed circuit board heating element 50 with a continuous etched copper or alulminum path 56 said path is depicted as a single line in FIG. 5. By varying the path width 56 and path separation 58, various size mirrors may be accommodated. The path width varies the necessary heating resistance. Said paths are superior to the round wire in the sinuous groove approach described in U.S. Pat. No. 3,160,736 because (1) the cross-section of the path is rectangular which increases the contacting surface area for improved heat transfer and (2) there are many heat generating paths per unit area thus greatly improving overall heat distribution. This is unlike the sinuous groove approach and is superior in efficiency. The board also contains an aperture 60 through which a temperature controller 54 protrudes to make contact with the mirror thereby providing automatic temperature control and thermal protection for said mirror. If the printed circuit board heating element 50 is sufficiently thin the electronic control package may be mounted directly onto the back of the printed circuit board and in such an instance, no aperture is therefore required.

FIG. 6 is a side view of a condensation free mirror assembly 64 showing the location of the printed circuit board heating element 50 which is mounted to the rear of transparent plate 46 to which has been applied a reflective coating 45. The printed circuit board heating element is mounted adjacent to said reflective coating. Also shown is the electronic control package 54 which is suitably mounted off center to the lower middle of the printed circuit board in close proximity to the aperture described above for FIG. 5.

FIG. 7 illustrates front view of a cabinet 65 such as a medicine cabinet containing the condensation free mirror assembly 46 with the cabinet door in the open position. The mirror assembly is shown in a disassembled form for illustration purposes. Also shown in frame 67 and power cord 62.

The operation of the condensation free mirror employed in conjunction with the electronic control circuit as described above is as follows. When the electronic control circuit senses the temperature of the mirror and it is below the preset "off" state, then the control circuit allows current to flow into the heating element. This adds heat to the mirror and thus causes an increase in temperature. The control circuit also senses an increase in temperature in such a way that if it increases above the "on" state, then it will cause heating current to cease and the mirror will cool down. The complete process is repeated when the mirror temperature falls below a pre-determined temperature.

As was described above, the printed circuit heating element is mounted to the side opposite the front mirror surface. The etched copper or aluminum paths are fixed to the reflective mirror surface. In carrying out the present invention, the following describes another means for mounting said printed circuit board heating element. A heat conducting and electrical insulator paint is brushed onto the surface containing the etched copper path. The paint provides additional electrical insulation and a good bonding surface. The etched surface is epoxied to the back of the mirror. The heat conducting epoxy greatly improves the efficiency of transferring the heat from the heat source (paths) to the rear of the mirror. This method of heat transfer is superior to the existing state of the art. The pre-requisites for the epoxy useful with the present invention include that it have the following properties: (1) an excellent electrical insulator; (2) an excellent heat conductor; (3) chemically inert; (4) somewhat physically flexible; (5) able to withstand temperatures up to 150°F.; (6) easily applicable before set time; (7) adhers excellent to reflective coating and to heat conducting paint; (8) low cost.

An epoxy which may be used in the present invention is one which has the following chemical composition. The epoxy is Dolphon CG 1062A which is epichlorohydrin bisphenol; a resin with fillers which are basically talc and silica; the hardner is a polyamine hardner (Dolphon RE-2002); the heat conducting paint is synthetic Dolphon EB-43-FB flat black enamel.

The invention provides a simple, efficient, effortless and economical means of raising the temperature of a mirror sufficiently above the dew point the thereby preventing condensation droplets from forming. One of the innovating concepts utilized with the present invention is limiting the temperature within prescribed ranges of the mirror which may be accomplished by incorporating an electronic control package such as described or by utilizing either Scheme No. 1 or Scheme No. 2 above described. Either scheme allows carefree and economical operation not afforded by other similar devices.

Other important features of the present invention include:

1. Warming a mirror with the use of a flexible printed circuit heating element which may be constructed with a mylar carrier. This is a cost advantage.

2. Flexible heating element which utilizes aluminum as the conductor. This is a cost advantage and has an increase in resistance as compared to copper.

3. Scheme number one (FIG. 1) does not require a temperature controller.

4. Scheme number two (FIG 2) requires a temperature controller for faster warm-up than scheme number one. This includes an additional parallel heat path which greatly increases life of mechanical controller.

5. Fixing flexible printed circuit heating element to mirror by use of pressure sensitive adhesive.

6. The use of a ground path which prevents current from leaking to a metal frame.

7. The printed circuit heating element as constructed in FIG. 3 enables safe operation while using potentially hazardous power source voltages, i.e., approximately 20 volts AC/DC or higher.

While having illustrated and described the preferred embodiments of the invention above, it is to be understood that the present invention is not limited to the precise constructions as herein disclosed and that various changes and modifications may be made within the scope of the invention as defined in the appended claims.

What is claimed is:

1. A condensation free mirror assembly comprising a transparent plate, a light reflective coating on one side of said plate, an electrically energizeable heating element consisting of a printed circuit board containing a ground path surrounding the perimeter of said board, a single continuous etched path of uniform thickness of a conductor material selected from the group consisting of copper, aluminum and Nichrome, a means for mounting said heating element to said transparent plate, a means for supplying electrical power to said heating element whereby electrical power can be transmitted to said heating element from said electrical power means thereby energizing said heating element whereby said plate is heated.

2. The condensation free mirror assembly of claim 1 wherein said printed circuit board heating element additionally contains an aperture through which a thermal fuse suitably protrudes and contacts said plate thereby providing a means for limiting the temperature of said plate below a maximum predetermined safe level.

3. The condensation free mirror assembly of claim 1 wherein said means for mounting said heating element comprises attaching said heating element to said transparent plate with a pressure sensitive adhesive.

4. A condensation free mirror assembly comprising a transparent plate, a light reflective coating on one side of said plate, an electrically energizeable heating element consisting of a printed circuit board containing a ground path surrounding the perimeter of said board, a conductor path of high resistance consisting of a continuous etched path of uniform thickness of a conducting material selected from the group consisting of copper, aluminum and Nichrome, a conductor path of low resistance consisting of a continuous etched path of uniform thickness of a conductor material selected from the group consisting of copper, aluminum and Nichrome, a temperature control means electrically connected between said conductor paths, a means for mounting said heating element to said transparent plate, a means for supplying electrical power to said heating element whereby electrical power can be transmitted to said heating element from said electrical power means, thereby energizing said heating element, whereby said plate is heated.

5. The condensation free mirror assembly of claim 4 wherein said means for mounting said heating element comprises attaching said heating element to said transparent plate with a pressure sensitive adhesive.

* * * * *